(No Model.)
B. T. STAUBER.
PROPELLER FOR VESSELS.
No. 559,912. Patented May 12, 1896.
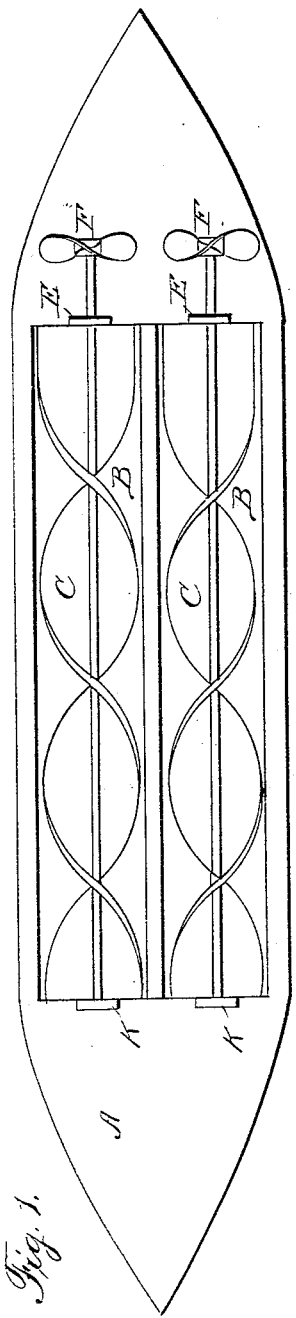
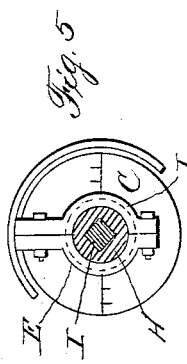
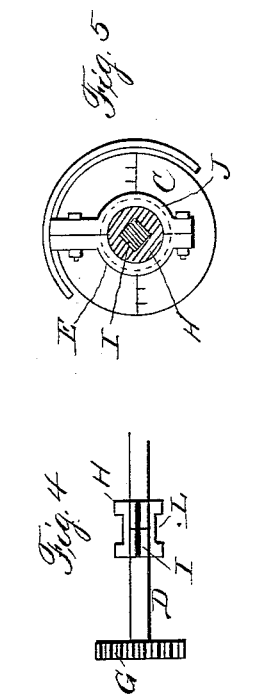
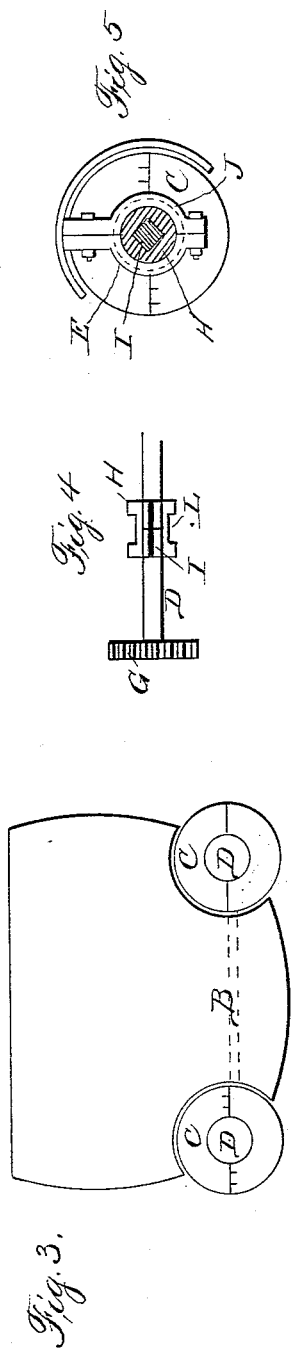
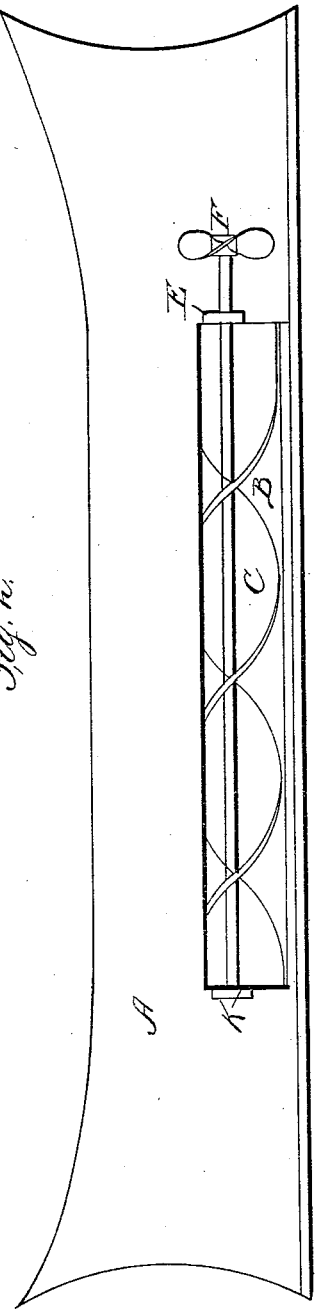
Witnesses
A. B. Smith
F. L. Ourand
Inventor
Benjamin T. Stauber,
By _____
Attorney
ANDREW B.GRAHAM. PHOTO-LITHO. WASHINGTON, D.C.

United States Patent Office.

BENJAMIN T. STAUBER, OF CONCORDIA, KANSAS.

PROPELLER FOR VESSELS.

SPECIFICATION forming part of Letters Patent No. 559,912, dated May 12, 1896.

Application filed May 9, 1893. Serial No. 473,520. (No model.)

*To all whom it may concern:*

Be it known that I, BENJAMIN T. STAUBER, a citizen of the United States, and a resident of Concordia, in the county of Cloud and State of Kansas, have invented new and useful Improvements in Propellers for Vessels and Boats, of which the following is a clear and exact specification, reference being had to the annexed drawings, illustrating the invention, in which—

Figure 1 is an inverted or bottom view of a vessel or boat with my improved propelling devices in position therewith. Fig. 2 is a side elevation of the vessel or boat with the propeller on one side in position for use; Fig. 3, a cross-section of Figs. 1 and 2 on line X; Fig. 4, an elevation of a portion of the propeller-shaft, showing one method of forming it in sections, and a drive-wheel thereon; Fig. 5, a section of the shaft at the splice and on line Z, Fig. 4, and also a section of one of the shaft-hangers.

This invention relates to novel means for propelling vessels and boats; and the nature thereof in brief consists in a semicylindrical groove or recess formed longitudinally within the lower portion of the vessel or boat at each side of the keel and a screw hung to rotate with half of its lateral projection in each groove and the other half in the free water, the screws being driven by suitable gearing a power to propel the vessel.

A represents a vessel or boat, which may have any desirable form and construction which will permit of the semicylindrical grooves B B being formed longitudinally within the external contour thereof to receive the shafts D and screws C thereon. For short vessels or boats the shafts, each, and screws thereon may be formed in one piece, with bearings K E at or near their ends, but for long vessels the shafts and screws may be in sections, which must be rigid as against the torsional force employed to drive the screws. One means for connecting the sections of shafts and screws thereon is shown at Figs. 4 and 5. The ends of the shafts are formed square, as at I, and inserted in a collar H, which is cylindrical in cross-section and provided within its periphery with an annular groove L, which is engaged by and rotates within a hanger J, which is rigidly secured to the internal periphery of each groove.

G represents one gear-wheel, which is to mesh into the gearing leading from suitable power within the vessel to rotate the screws.

In larger vessels power may be applied at two or more points on each shaft, and the screw at each side of the vessel may be in two or more parts, and each pair of parts on opposite sides of the vessel may be operated by a separate engine, both engines operating both pairs of screws when speed or power is required. Again, should one engine become disabled the other is available, and half the motive power is available.

Inasmuch as at a small cost the shafts D of the screws C can be made to extend past the screws at the aft of the vessel, screw-propellers (shown at F) may be attached thereto to aid as a motive power. The advantage of having two pairs of screws C, one fore and the other aft, is that the vessel can be rapidly changed in its course through the water.

In the construction of the semicylinders B, the screws, and their driving mechanism care must be taken that the material be of good quality and the workmanship equal to that employed to insure staunch, seaworthy vessels. When these conditions are attained, a more uniform propelling power will be the result in various seas.

I claim as new and desire to secure by Letters Patent of the United States—

An improved propeller for vessels and boats consisting of a vessel or boat which is provided with a semicylindrical groove on the under portion or on each side thereof from the keel, with a suitably-hung screw with half of its lateral projection within each semicylindrical groove, and half of such projection without the grooves, in combination with screw-propellers attached to the aft ends of the shafts of the long screws, as and for the purpose specified.

BENJAMIN T. STAUBER.

Witnesses:
CHARLES L. BOTSFORD,
GEO. W. TITTLE.